United States Patent [19]
Danner

[11] Patent Number: 5,140,588
[45] Date of Patent: Aug. 18, 1992

[54] CIRCUIT FOR CALCULATING THE QUANTITY OF MESSAGE SIGNALS SUPPLIED TO AN ATM SWITCHING DURING VIRTUAL CONNECTIONS

[75] Inventor: Gerd Danner, Munich, Fed. Rep. of Germany

[73] Assignee: Siemens Aktiengesellschaft, Munich, Fed. Rep. of Germany

[21] Appl. No.: 588,036

[22] Filed: Sep. 25, 1990

[30] Foreign Application Priority Data

Sep. 29, 1989 [DE] Fed. Rep. of Germany ....... 3932607
Apr. 27, 1990 [DE] Fed. Rep. of Germany ....... 4013628

[51] Int. Cl.⁵ .......................... H04J 3/24; H04L 12/56
[52] U.S. Cl. ..................................... 370/94.1; 370/60; 370/17; 379/115
[58] Field of Search .................... 370/94.1, 60, 13, 17, 370/84; 379/114, 133, 134, 115

[56] References Cited

U.S. PATENT DOCUMENTS

| | | | |
|---|---|---|---|
| 4,769,810 | 9/1988 | Eckberg, Jr. et al. | 370/94.1 |
| 4,769,811 | 9/1988 | Eckberg, Jr. et al. | 370/94.1 |
| 4,896,316 | 1/1990 | Lespagnol et al. | 370/94.1 |
| 4,993,024 | 2/1991 | Quinquis et al. | 370/84 |
| 5,007,048 | 4/1991 | Kowalk | 370/60 |

OTHER PUBLICATIONS

Article entitled New Directions in Communications-International Zurich Seminar of Mar. 1986, pp. A3.1-A3.8 by J. Turner.

*Primary Examiner*—Stephen Chin
*Assistant Examiner*—H. Kizou
*Attorney, Agent, or Firm*—Hill, Van Santen, Steadman & Simpson

[57] ABSTRACT

A circuit arrangement for call-associated identification of transmitted message signals in an ATM switching system wherein each of the incoming trunks has a plurality of counters which correspond in number to the plurality of virtual connections. When a message appears, the message cells drive the counters for a call-associated acquisition of the message cells based on the description of the cell header contained therein that identified the particular virtual connection.

9 Claims, 3 Drawing Sheets

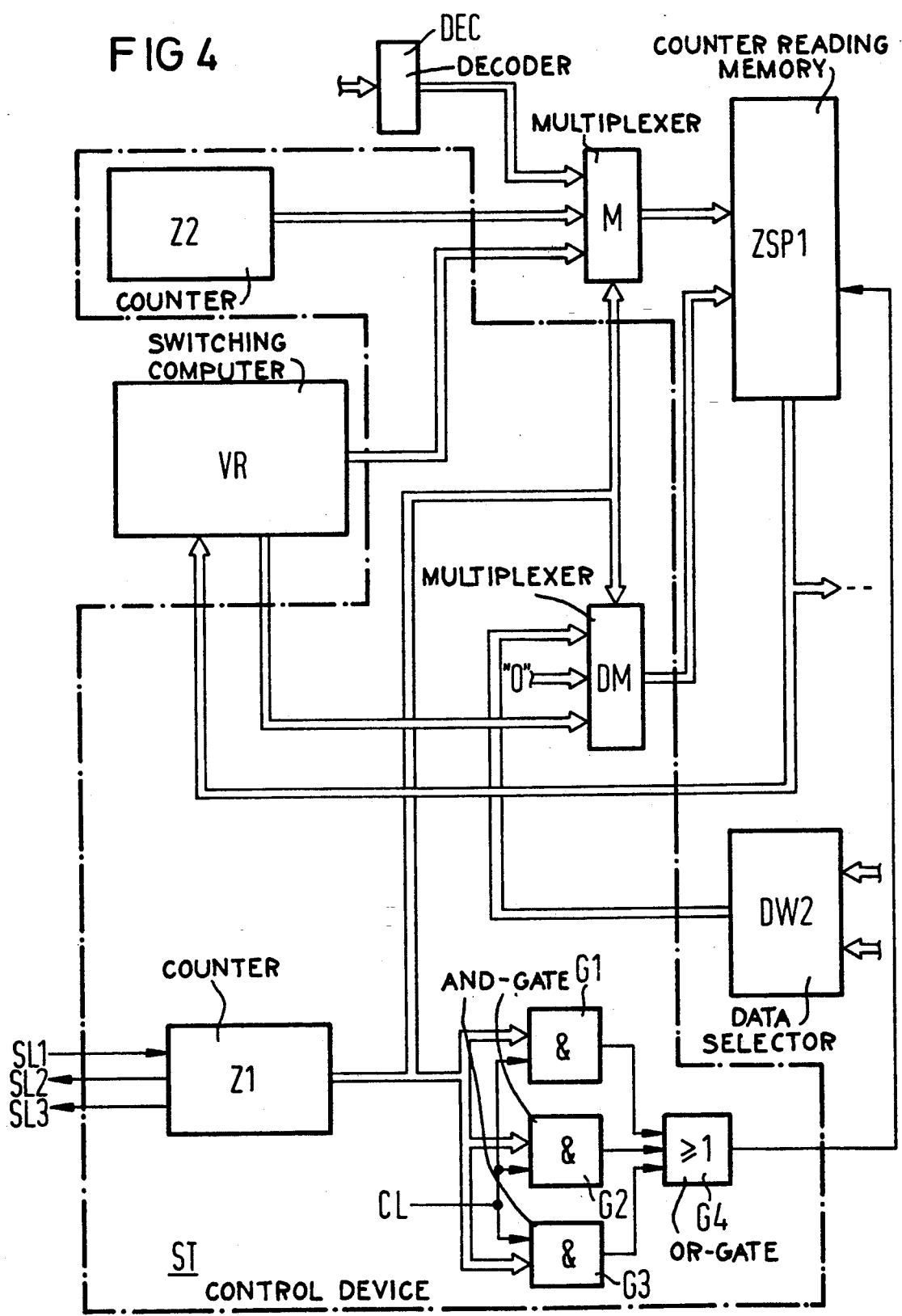

CIRCUIT FOR CALCULATING THE QUANTITY OF MESSAGE SIGNALS SUPPLIED TO AN ATM SWITCHING DURING VIRTUAL CONNECTIONS

CROSS-REFERENCE TO RELATED APPLICATIONS

This application is related to application Ser. No. 588,038 filed Sep. 25, 1991, entitled "Circuit For Checking The Defined Transmission Bit Rates", now U.S. Pat. No. 5,117,417, in which the Inventor is Gerd Danner assigned to the assignee of the present application.

BACKGROUND OF THE INVENTION

1. Field of the Invention

This invention relates in general to circuit arrangements for calculating the quantity of message signals supplied to an ATM switching system during virtual connections which utilizes a plurality of counters which correspond in number to the number of virtual connections and wherein each counter has an individual memory area.

2. Description of the Prior Art

So as to avoid overload in the transmission of cells in broadband switching systems, it has been proposed in the article International Zurich Seminar On Digital Communications of March 1986 entitled "New Directions In Communications A3.1 Through A3.8" by J. B. Turner to allocate a forward-backward counter in a switching node to every subscriber equipment which is connected and the forward-backward counter counts the cells transmitted by the respective subscriber equipment and lowers the momentary counter reading corresponding to the transmission rate defined by respective subscriber equipment at specified times. When the momentary counter exceeds a value prescribed by the respective subscriber equipment, then the switching node recognizes an overload ("leaky bucket" method).

An additional circuit arrangement for avoiding overload in a broadband switching system is described in German published application No. 37 32 937 of which U.S. Pat. No. 5,007,048 is the U.S. equivalent. Instead of a forward-backward counter, two forward counters in this circuit arrangement are allocated in a switching node to every subscriber equipment which is connected and a first counter counts the cells sent by the respective subscriber equipment and the other counter calculates the connection time during the existing call. The two counters are connected to a means which based on the relationship between the counter readings checks the observation of the maximum bit rate defined by the respective subscriber equipment A call charge acquisition is also provided on the basis of the counter readings.

SUMMARY OF THE INVENTION

It is an object of the present invention to provide a circuit for calculating the quantity of message signals respectively supplied to an ATM switching system during virtual connections.

The invention has the advantage that the call-associated counter means makes it possible in a simple manner for the transmitted quantity of message signals to be individually calculated for the purpose of a call charge acquisition for virtual connections proceeding by way of arbitrary offering trunks which are connected to an ATM switching system. For example, a call-associated calculation for offering trunks that are used in common by a plurality of subscriber equipment in multiplex operation is possible Such a call-associated calculation can also be implemented when subscriber equipment are simultaneously involved in a plurality of virtual connections.

In the case where message signals in the course of virtual connections are transmitted in the form of message cells having a fixed length, it is adequate for a call-associated calculation of transmitted quantities of message signals in the present invention to modify the momentary first counter reading of the counter means coming into consideration only once by the counter unit upon the appearance of a message cell. When by contrast, a transmission of message signals during the course of virtual connections occur in message cells having variable lengths then it is expedient in response to a drive of one of the counter means that the momentary first counter reading be modified by one count unit after a respectively defined plurality of message bits belonging to the message cell just appearing. This plurality can be defined according to the precision required for the call charge acquisition.

A further advantageous development of the present invention provides that due to the output of an indicator signal every time a defined maximum counter reading is reached that the memory capacity of the memory areas allocated to the individual counter means as well as the capacity of the adder means can be designed to be relatively low. The plurality of indicators signals that appear during the course of a virtual connection can be individually summed up at a central location in call-associated fashion.

An additional advantage of the invention results in that due to the call-associated counter means for the virtual connections preceding over arbitrary offering trunks connected to a ATM switching system the observation of defined transmission bit rates can be additionally individually checked in a simple manner in addition to a calculation of the quantity of transmissive message signals for the purpose of a call charge acquisition. Thus, for example, a call-associated check of defined transmission rates for offering trunks that are used in common in multiplex operation by a plurality of subscriber equipments is possible. Such a call-associated checking can also be implemented in the case wherein subscriber equipment are simultaneously involved in a plurality of virtual connections In the case wherein message signals in the course of virtual connections are transmitted in the form of message cells having a fixed length, it is adequate for a call-associated checking of defined transmission bit rates given the present invention to modify the momentary second counter reading with every drive of one of the counter means only once by a bit rate corresponding to the defined transmission bit rate. When by contrast, a transmission of message signals in the course of virtual connections occurs in message cells having variable lengths, then it is expedient that during the course of an activated control cycle in response to the appearance of a message cell a momentary second counter reading is modified by the bit rate value defined for the respective virtual connection after a respectively defined plurality of bits belonging to the message cell just appearing. This plurality can thereby be defined according to the precision required for the checking of transmission bit rates.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 4 is an exemplary embodiment of the control means shown in FIG. 3.

DESCRIPTION OF THE PREFERRED EMBODIMENTS

The invention has the advantage in that a simple control of counter means associated with the offering trunks can be accomplished and also the circuit may be made very economically.

Figure 1:
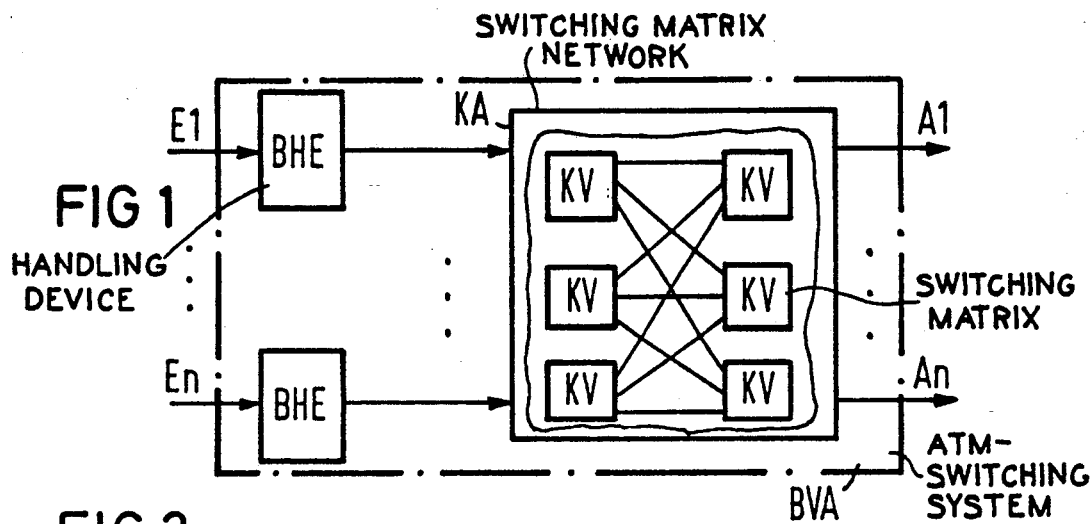
FIG. 1 is a block diagram of an ATM switching system in which the invention is utilized.

FIG. 1 schematically shows an ATM switching system BVA which has a plurality of incoming trunks E1 through En as well as a number of output ports A1 through An. Only the incoming trunks E1 and En and the output ports A1 and An are indicated in FIG. 1. A transmission of message cells during the course of virtual connections occurs on the incoming trunks and output trunks based on an asynchronous transmission method ("asynchronous transfer mode"). Assume that the message cells have a fixed length that respectively have a cell header with a virtual channel number indicating the respective virtual connection as well as an information part available to them. The transmission of the actual message signals occurs in the information portion. Message signals are to be understood as data and text signals as well as voice, or respectively video signals in digital form. It is also to be realized that the present invention can also be utilized when message signals are transmitted in cells of variable length.

As shown in FIG. 1, a handling means BHE is allocated to each of the incoming trunks E1 through En. Such a handling means which will be described hereafter accepts the message cells transmitted by way of the associated incoming trunk during the course of virtual connections and forwards such signals to a switching matrix network KA of the ATM switching system. The handling means BHE calculates the quantity of message signals transmitted during the course of respective virtual connection in call-associated fashion FIG. 1 also shows a multistage structure which has a plurality of switching matrices KV connected to each other which serves as an example of the switching matrix network KA. Arbitrary one stage or multi-stage switching matrix networks can however also be utilized. The structure and functioning of such switching matrix networks are known to those skilled in the art and will not be further discussed herein.

Figure 2:
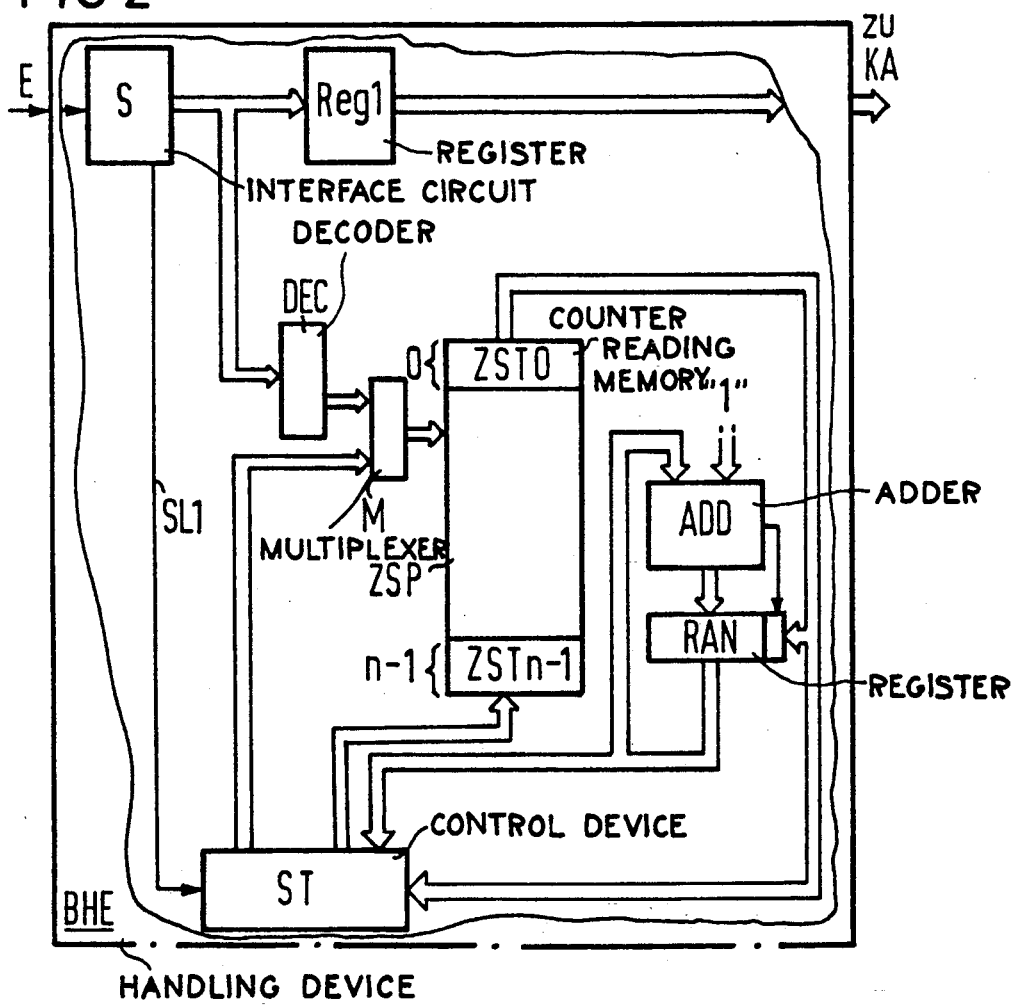
FIG. 2 is a first exemplary embodiment of the handling equipment shown schematically in FIG. 1.

FIG. 2 illustrates a first exemplary embodiment of one of the handling means BHE. Only those circuit parts which are required for an understanding of the present invention are shown.

The respective incoming trunk E is connected to an interface means S which recognizes the beginning of message cells transmitted in serial form and second combines bits respectively appearing in message cells into bit groups having a respectively defined number of bits of, for example, eight bits and supplies the individual bit groups (octets) in parallel form via a line system. A register Reg1 which serves as a delay means as well as a decoder DEC are connected to the output of the interface means S. The register Reg1 is traversed by all of the message cells which are to be forwarded to the previously mentioned switching matrix network KA. The delay time is defined so that the circuit arrangement to be described below can undertake a registration before a forwarding of a message cell that has been registered occurs.

The cell header of a message cell accepted into the register Reg1 is additionally supplied to the decoder DEC which decodes the virtual channel number contained in this cell header and offers address signals which are supplied to a counter reading memory ZSP formed as a write-read memory and which signals are supplied through the first inputs of a multiplexer M. The counter reading memory ZSP comprises a separate memory area for each of the virtual connections which are possible on the associated incoming trunk E. The individual memory areas can thus be individually driven based on the identification of virtual channel numbers contained in the message cells and which are decoded by the decoder DEC. When, for example, n virtual connections referred to as "0" through "n−1" can proceed by way of the associated incoming trunk, then memory areas referenced "0" through "n−1" as indicated in FIG. 2 are allocated to each of these and these memory areas are a respective part of a counter means individually associated to the respective virtual connection. The individual memory areas thus serve the purpose of storing a momentary counter reading of the respective counter means. This storing occurs under the control of a control means ST shown in FIG. 2 that is connected by line systems to first data inputs and data outputs of the counter reading memory ZSP and second to second inputs of the multiplexer M and is also connected by way of a control line SL1 to the interface means S. The momentary counter readings stored for the virtual connections are referenced ZST0 through ZSTn−1 according to their association with the individual virtual connections in FIG. 2.

A common adder means is available to the individual counter means in multiplex operation and is associated with all counter means allocated to an incoming trunk and belong thereto in addition to an individual memory area of the counter reading memory ZSP. This adder means comprises a register RAN as well as an adder ADD. Loading inputs of the register RAN are connected with data outputs of the counter reading memory ZSP by way of a line system. At the output side the register RAN is connected to first inputs of the adder ADD. The adder ADD whose second inputs receive a binary "1" produces aggregate signal outputs which are connected to data inputs of the register RAN and also has an overflow output which is connected to a separate register location of this register. The output side of the register RAN is also connected with the control means ST.

The operation of the handling means BHE will now be described.

Momentary counter readings are individually stored in the memory areas of the counter reading memory ZSP that are associated with the individual virtual connections. As momentary counter reading a defined starting counter reading that, for example, may be assumed as "0" is thereby entered by the control means ST during the setup of the respective virtual connection.

When a message cell appears on the incoming trunk E in FIG. 2, it passes through the interface means S and is supplied to the register Regl after an octet by octet conversion. The appearance of the message cell is also reported to the control means ST by an indicator signal transmitted on the control line SL1. From the interface S an output is supplied to the decoder DEC which accepts the cell header contained in the message cell just appearing.

In response to the appearance of the indicator signal, the control means ST controls a read cycle in the counter reading memory ZSP based on the identification of the address signals offered by the decoder DEC through the multiplexer M. As a result, this counter reading memory supplies the momentary counter stored in the memory area just being addressed at its data outputs. This momentary counter reading which, for example, may be assumed to be the initial counter reading "0" is thereby transferred into the register RAN through the loading inputs. The adder ADD which is connected to this register subsequently increments the momentary counter reading by the binary value "1". The modified momentary counter reading resulting therefrom is subsequently entered into the register RAN while overwriting the counter reading previously accepted through the loading inputs. Under the control of the control means ST, a write cycle in the counter reading memory ZSP follows. The momentary counter reading now stored in the register RAN is thereby entered into the memory area addressed by the decoder DEC by way of the multiplexer M and, thus, the momentary counter reading previously stored is overwritten. The registration of the message cell just accepted into the handling means BHE shown in FIG. 2 is thus concluded.

The occurrences just described are repeated with every appearance of a message cell on the incoming trunk E in FIG. 2 so that an individually calculated momentary counter reading is stored in the counter reading memory ZSP for all virtual connections that occur.

The adder ADD moreover is designed such that given the described formation of a new momentary counter reading it simultaneously monitors an upward transgression of a defined maximum counter reading and given such an upward transgression produces an overflow output signal in the form of an overflow bit by way of the previously described overflow output. The counter means formed by the individual memory areas of the counter reading memory ZSP and the adder ADD represents periodically circulating counter means that supply an overflow signal every time the maximum counter reading has been reached.

An overflow bit output by the adder ADD is accepted into the separate register location of the register RAN that was described above. This register location, for example, can be interrogated by the control means ST during the course of a following read cycle that has already been mentioned and being interrogated in view of the presence of an overflow bit. However, one can also provided that an overflow bit appearing in the register location is directly supplied to the control means ST so as to activate an interrupt routine therein during which the control means identifies the respective virtual connection on the basis of address signals just supplied to the counter reading memory. Without regard to the manner in which the control means is supplied with overflow bits, these are registered by the control means in call-associated fashion.

The control events described are repeated for each of the virtual connections until they are cleared down. During the course of such a cleardown, the control means ST interrogates the momentary counter reading stored in the counter reading memory ZSP for the respective virtual connection and for a following call charge acquisition, combines this with a number of overflow bits already registered in the control means for the respective virtual connection so as to form an overall counter reading.

Instead of registering overflow bits for the individual virtual connections, the capacity of the adder ADD as well as the memory capacity of the individual memory areas of the counter reading memory ZSB can be defined such that an overflow of the above-described counter means is impossible even given a transmission of message cells with the highest possible transmission bit rate. During the course of clearing down a virtual connection in this case, the control means ST only has to interrogate the momentary counter reading associated therewith on the basis of a corresponding selection of the counter reading ZSP for a following call charge acquisition.

Figure 3:
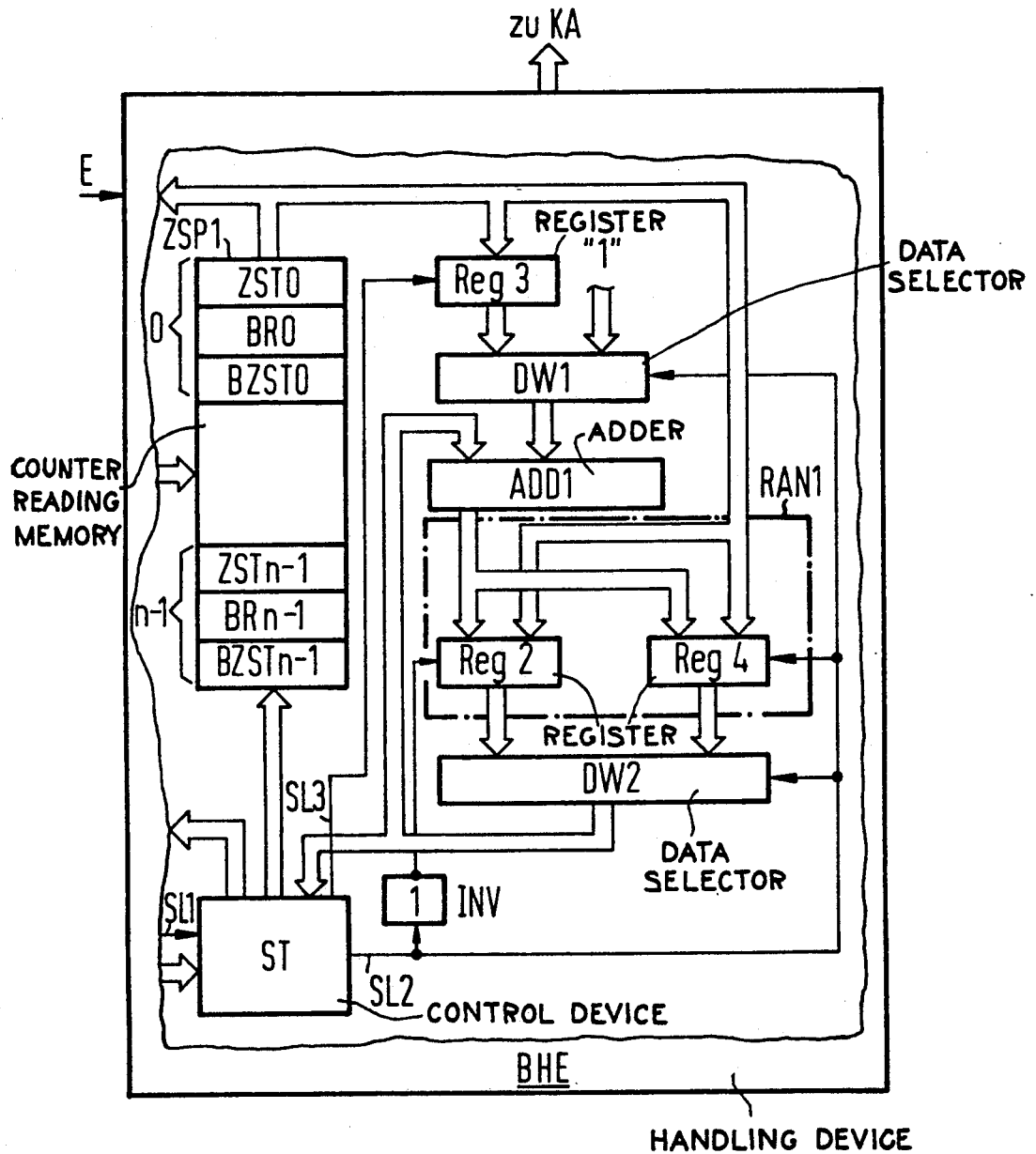
FIG. 3 is a second exemplary embodiment of the handling equipment shown in FIG. 1.

FIG. 3 shows a second exemplary embodiment of the handling means BHE which is schematically shown in FIG. 1. The circuit parts which have been modified relative to FIG 2 are shown in FIG. 3.

A counter reading memory ZSP1 comprises a plurality of memory areas corresponding in number to the plurality of virtual connections possibly proceeding by way of the incoming trunk E. The individual memory areas are indicated "0" through "n−1". In addition to a momentary counter reading ZST0 through ZSTn−1 in FIG. 2 that was previously described with reference to FIG. 2 and which is referenced below as a momentary first counter reading, a second momentary counter reading and a bit rate value individually definable for the respective virtual connection are stored in these memory areas. This storing occurs under the control of the control means ST shown in FIG. 3. The momentary second counter readings and bit rate values stored for the virtual connections are referenced BZST0 through BZSTn−1 or respectively with BR0 through BRn−1 corresponding to the respective individual virtual connections.

Each of the memory areas of the counter reading memory ZSP1 is again a portion of an individual counter means whereby all counter means have a common adder means available to the individual counter means in multiplex operation. This adder means comprises an adder ADD1 as well as a register RAN1. This register arrangement is composed of two registers Reg2 and Reg4 which by way of data inputs are connected in common to aggregate signal outputs of the adder and by way of data outputs are connected to separate data inputs of a data diplexer DW2. Loading inputs of both registers are also in communication with a line system to data outputs of the counter reading memory ZSP1.

Data outputs of the data diplexer DW2 are in communication with the control means ST and with first inputs of the adder ADD1. Second inputs of this adder are charged by way of a second data diplexer DW1 either with a binary value "1" or with a bit rate value that can be loaded into a register Reg3 from the counter reading memory ZSP1.

A control line SL2 extends from the control means ST to control inputs of the two data diplexers DW1 and DW2 and the registers Reg2 and Reg4 as well as a further control line SL3 to a control input of the register Reg3. An inverter INV is connected before the control inputs of the register Reg2.

The function of the handling means BHE of FIG. 3 will now be discussed.

As previously discussed, individually defined bit rate values BR0 through BRn−1 are entered in the memory areas of the counter reading memory ZSP1 which are allocated to the individual virtual connections. The definition occurs during the course of the setup of the respective virtual connection of the control means ST, based on the prescription of a transmission bit rate that is specified by the subscriber equipment (calling subscriber equipment) that desires the connection to be setup. The control means ST can allocate a normal bit rate value, for example, the bit rate value "1" to a maximally specifiable transmission bit rate. For a transmission bit rate that varies from the maximally specifiable transmission bit rate on the other hand, the allocated bit rate value amounts to a multiple of the normal bit rate value that corresponds to the ratio of the maximally specifiable transmission bit rate to the current transmission rate. When, thus, a transmission bit rate specified by a subscriber equipment is only one-half the maximally specified transmission bit rate then the bit rate value "2" is defined. During the course of a write cycle following such a definition, the control means ST enters the respective bit rate value into the memory area of the counter reading memory ZSP associated with the respective virtual connection for the entire duration of the connection. For this entry, the memory area is addressed by way of the multiplexer M shown in FIG. 2.

A starting counter reading previously discussed with respect to FIG. 2 is also entered into this memory area as a momentary first counter reading. The momentary first counter readings entered into the individual memory areas are referenced ZST0 through ZSTn−1 in FIG. 3.

During the course of memory cycles that are periodically repeatedly executed, the control means ST successively respectively drives all memory areas of the counter reading memory ZSP1 for an interrogation of the momentary second counter reading (BZST0 through BZSTn−1) respectively stored therein. After the conclusion of the interrogation, the respective momentary second counter reading is converted into a defined starting counter reading. Let the starting counter reading be defined, for example, as "0".

When a message cell than appears on the incoming trunk E shown in FIG. 3, then the control means ST activates a control cycle of the type which is described with reference to FIG. 2. During the course of this control cycle, a read cycle is first carried out in the counter reading memory ZSP1 according to the description of the address signals just supplied to it. As a result, the counter reading memory successively offers the particulars stored in the memory area being addressed as its data outputs. As already mentioned above, these particulars are a bit rate value defined for the respective virtual connection, a momentary first counter reading and a momentary second counter reading. The momentary first counter reading is thereby transferred by way of the aforementioned loading inputs into the register Reg2, but the momentary second counter reading is transferred into the register Reg4. The bit rate value that is additionally offered is supplied to the register Reg3. These registers are correspondingly controlled by control signals produced by the control means ST for this purpose. The two data diplexers DW1 and DW2 are subsequently set so that proceeding from the control means ST that the registers Reg3 and Reg4 have their data outputs connected to the inputs of the adder ADD1. The adder ADD1 subsequently adds the bit rate value to the momentary second counter reading, in other words, to the starting counter reading "0" given in the above example. The modified momentary second counter reading resulting therefrom overwriting the counter reading previously accepted by way of the loading inputs. A reswitching of the data diplexers DW1 and DW2 as well as of the registers Reg2 and Reg4 follows so that the data outputs of the register Reg2 are connected on the one hand to the adder ADD1 and on the other hand, the adder ADD1 is additionally charged by way of the data diplexer DW1 with the above-recited numerical value of binary value "1". The adder thus adds this numerical value of the momentary first counter reading which has just been stored in the register Reg2. The modified momentary first counter reading resulting is subsequently entered into the register Reg2 while overwriting the momentary first counter reading previously stored therein. This is followed by a write cycle in the counter reading memory ZSP1 activated by the control means ST. The momentary counter readings which have just been stored in the two registers Reg2 and Reg4 are then entered as current momentary counter readings into the momentary area of the counter reading memory ZSP1 that was previously addressed. The control cycle for the acquisition of the memory cell just accepted into the handling means BHE shown in FIG. 3 is thus concluded.

The events just described repeat with every appearance of a message cell on the incoming trunk E shown in FIG. 3.

In the second exemplary embodiment shown in FIG. 3, also the momentary first counter readings are updated in the individual memory areas of the counter reading memory ZSP1 until the cleardown of the respective virtual connection in the above-described manner. In response to the cleardown of such a virtual connection, an interrogation of the momentary first counter reading then occurs for a following call charge.

As previously mentioned, the control means ST additionally activates periodically repeating memory cycles so as to interrogate the momentary second counter readings stored in the individual memory areas of the counter reading memory ZSP1 and to subsequently convert the respective momentary second counter readings into the defined starting counter reading.

In such an interrogation, a check is carried out to see whether the respective momentary second counter reading lies above a maximum counter reading which is uniformly defined for all virtual connections. Based on the description of the above-recited bit rate values and on the duration of a time interval between two successive memory cycles, this maximum counter reading is defined such that this is reached or, respectively, exceeded by a momentary second counter reading whenever message cells during the course of the respective virtual connection are transmitted with a transmission bit rate that is higher than the transmission bit rate originally specified by a subscriber equipment. When the maximum counter reading is exceeded, the process can be continued for example such that the message cell that follows next during the course of the respective virtual connection or following message cells is/are excluded from forwarding to the switching matrix network KA shown in FIG. 1.

With respect to the adder ADD1 shown in FIG. 3, it should also be noted that this can be designed so that during the course of the above-recited formation of a momentary first counter reading or respectively, momentary second counter reading, this also indicates an upward transgression of the defined maximum counter reading by an overflow signal in the form of an overflow bit at a separate overflow output. Such an overflow bit can then be accepted into a separate register location of the register Reg2 or, respectively, Reg4. The handling of an overflow bit stored in the register Reg2 can occur in the manner set forth with regard to FIG. 2. An overflow bit stored in the register Reg4 can on the other hand be transferred into the counter reading memory ZSP1 as part of the momentary second counter reading offered by the adder ADD1. During the course of the previously mentioned memory cycle in the counter reading memory ZSP1 for interrogating the individual momentary second counter readings, the only thing to be done is to check whether an overflow bit is stored with the respective memory second counter reading.

In the above-described second exemplary embodiment of FIG. 3, the tolerance limits for the indication of the upward transgression of the specified transmission bit rates on the basis of the definition of the individual bit rate values and of the uniform maximum counter reading vary inversely proportional to the defined transmission bit rates. When an individual definition of such a tolerance limit is desired for the individual specifiable transmission bit rates, then the above-described exemplary embodiment can be modified such that a maximum counter reading as well as the bit rate value associated therewith is individually calculated for each o the virtual connections based on the prescription of a specified transmission bit rate, of the duration of the time interval between two successive memory cycles as well as the respectively desired tolerance limit. Maximum counter readings and associated bit rate values are thereby entered in common into the previously mentioned memory areas of the counter reading memory ZSP1 associated with the individual virtual connections. In the implementation of the described read cycle, both the respective bit rate value as well as the maximum counter reading associated thereto are supplied to the adder ADD1 for example, by way of a register expanded in comparison to the register Reg3 shown in FIG. 3. With reference to these values, the adder first calculates a new momentary second counter reading in the above-described manner. This is subsequently compared to the supply maximum counter reading so that the adder ADD1 outputs a comparison signal corresponding to the previously mentioned overflow signal given the transgression thereof by the momentary second counter reading that has just been calculated. The control procedures to be implemented in response then correspond to the control procedures described above.

With respect to the exemplary embodiments shown in FIG. 3, only that case is considered where message signals are transmitted in message cells of fixed length during the course of the virtual connections. When, by contrast, such message cells have variable lengths, then the above-described control cycles can also be modified such that at every appearance of a message cell, both the momentary first counter reading as well as the momentary second counter reading are modified in the above-described manner, for example, after a respectively defined plurality of bits belonging to the message cell that has just appeared. The plurality of bits is thus dependent on the precision with which the monitoring of specified transmission bit rates or, respectively, the call charge calculation is to occur.

It is also pointed out that the second exemplary embodiment can also be modified such that an overflow bit occurring at the output of the adder ADD1 in the formation of a momentary second counter reading is directly supplied to the control means ST so that the latter can be able to immediately prevent the onwarding of the next following message cell or of the following message cells for the respective virtual connection.

FIG. 4 illustrates an exemplary embodiment of the control means ST shown with reference to FIG. 3 and also shows the connection to the circuit elements of FIG. 3. It is assumed as an example for the following explanation that the previously discussed first and second counter readings for the individual virtual connections are entered into the counter reading memory ZSP1 without a separate setting of overflow bits in the registers Reg2 and Reg4 (FIG. 3) and that message cells having a fixed length are transmitted and dummy cells corresponding thereto are transmitted during transmission pauses.

As shown in FIG. 4, the control means ST comprises a first counter arrangement Z1 which is connected to the control lines SL1, SL2 and SL3 as shown in FIG. 3 and which is synchronized by a control signal transmitted by way of the control line SL1 and that runs for a counting period that corresponds to the plurality of octets appearing in a message cell or, respectively, dummy cell. The counter Z1 therefore provides three defined counter readings as address signals. These address signals are output to three AND elements G1 through G3 each of which respectively respond to one of these address signals. The AND elements G1 through G3 are also charged commonly with clock pulses CL so that the AND elements G1 through G3 successively offer a prescribed plurality of clock pulses within a message cell or, respectively, dummy cell and these clock pulses are supplied by way of a following OR element G4 to the counter reading memory ZSP1 as write pulses.

The address signals offered by the counter arrangement Z1 are also output to control inputs of the multiplexer M schematically shown in FIG. 3 which serves as an address multiplexer and are output to a data multiplexer DM associated therewith. The outputs of the multiplexers M and DM are supplied to address and data inputs of the counter reading memory ZSP1. In addition, to the decoder DEC shown in FIG. 3, a second counter arrangement Z2 as well as an address bus of a switching computer VR, for example, in the form of a microprocessor arrangement that ranks higher than all handling means BHE shown in FIG. 2 are connected to the input of the multiplexer M by way of three line systems. The counter arrangement Z2 that runs with a counting period that corresponds to the plurality of memory areas present in the counter reading memory ZSP1 thereby offers continuous address signals based on the prescription of the duration of previously mentioned periodically repeated executed memory cycle.

Also, the data diplexer DW2 shown in FIG. 3, a defined starting counter reading in the form of, for example, of a binary "0" as well as a data bus of the switching computer VR are connected to the input of the multiplexer DM by way of the three line systems.

Three separate processing times spans are defined within a message cell or, respectively, dummy cell by the address signals output by the counter arrangement Z1. A first of the processing time spans during which the decoder DEC and the data diplexer DW2 are connected by way of the multiplexers M and DM to the counter reading memory ZSP1 thereby serves upon the appearance of a message cell for the readout of the allocated first or, respectively, second counter reading and of the defined bit rate value from the counter reading memory and serves for the following write-in of the updated first or, respectively, second counter reading for this counter reading memory. For this purpose, the counter arrangement Z1 also provides the control signals by way of the control lines SL2 and SL3 that are required for the control of the data diplexers DW1 and DW2 and of the registers Reg2, Reg3 and Reg4 shown in FIG. 3.

A second processing time span during which the counter arrangements Z2 as well as the starting counter reading are connected by way of the multiplexers M and DM to the counter reading memory is reserved for the periodically provided interrogation of the second counter readings stored in the counter reading memory and for the subsequent conversion of the respective second counter reading into the defined starting counter reading within the framework of the above discussed memory cycles. Since the counter arrangement Z2 continuously offers address signals, an interrogation and subsequent conversion into the starting counter reading occurs for all second counter readings stored in the counter reading memory ZSP1 during the course of a memory cycle extending over a plurality of message cells or respectively dummy cells. The evaluation of the individual interrogated second counter readings occurs with the switching computer VR.

During a third processing time span, finally the switching computer VR has its address bus and data bus in communication by way of the multiplexers M and DM with the counter reading memory ZSP1. As a result thereof, this switching computer on the one hand can enter the previously mentioned starting counter readings as well as the bit rate value defined for a virtual connection into the memory area of the counter reading memory which is to be considered in the setup of this virtual connection. On the other hand, the first counter reading stored in the counter reading memory and which is considered for a virtual connection can be transferred for an evaluation during the cleardown of this virtual connection.

In conclusion, it should be noted that the control means that has just been set forth is merely an expedient exemplary embodiment. The functions to be carried out by this control means can also be realized by other circuit arrangements. Also, the control means shown in FIG. 4 in the exemplary embodiment with respect to FIG. 2 can also be modified such that it only controls the executions provided in the explained first and third processing time spans. The counter arrangements Z2 connected to the multiplexer M as well as the supplying of the initial counter reading at the data multiplexer DM are thus eliminated.

Also, the counter arrangement Z1 may only offer two address signals for the two multiplexers and for two AND elements G1 and G2.

Although the invention has been described with respect to preferred embodiments, it is not to be so limited as changes and modifications can be made which are within the full intended scope of the invention a defined by the appended claims.

I claim as our invention:

1. A circuit arrangement for calculating the quantity of message signals respectively supplied to an ATM switching system via incoming trunks in the transmission of message cells based on an asynchronous transmission method during virtual connections of the incoming trunks, comprising for each of the incoming trunks a plurality of counter means which are each associated with one of the virtual connections possible for the respective incoming trunk, said counter means are each respectively formed of an individual memory of a write-read memory for storing a counter reading and of an adder means which is a part of said counter means and connected to said write-read memory, during set up of one of said virtual connections, a defined starting counter reading is entered as a first counter reading into the individual memory area associated with the virtual connection which is being set up, upon each appearance of a message cell a cell header contained therein is evaluated for determining the virtual connection in question and the individual memory area associated therewith operates in a control cycle for the transmission duration of said message cell during which control cycle the first counter reading stored in said individual memory area is first supplied to the adder means for incrementing the first counter reading at least once by one during the appearance of said message cell and a first counter reading resulting therefrom is subsequently entered into the individual memory area involved in said control cycle while overwriting the first counter reading which was previously stored therein, and at a clear down of a virtual connection the individual memory area associated thereof is activated for supplying the first counter reading contained therein.

2. A circuit arrangement according to claim 1, wherein during said control cycle the first counter reading of the counter means involved in said control cycle is incremented by one after reception of a respectively defined plurality of bits belonging to the message cell which has caused said control cycle.

3. A circuit arrangement according to claim 1, wherein each of said counter means is respectively composed of an individual memory area of the write-read memory and the adder means, said counter means is formed as a modulo-m-counter wherein in said control cycle an exceed signal is supplied by said adder means when a maximum capacity of the counter means is exceeded and wherein exceed signals supplied by the adder means are individually accumulated for each of said counter means, and wherein at a clear down of a virtual connection the first counter reading contained in the individual memory area of the counter means associated to that virtual connection and the exceed signals accumulated for that counter means are combined to obtain a total first counter reading.

4. A circuit arrangement according to claim 1 wherein a second counter reading and a bit rate value corresponding to the transmission bit rate defined for the respective virtual connection is additionally stored in each of the memory areas of the write-read memory, a defined starting counter reading is respectively entered as a second counter reading into the individual memory areas at defined time intervals, during a control cycle activated in response to the appearance of a message cell, the second counter reading stored together with the bit rate value appertaining thereto are supplied to the adder means in addition to the first counter reading, the respective second counter reading is changed at least once by the bit rate value associated therewith during the control cycle being executed and the second counter reading resulting therefrom is entered into the respective memory area while overwriting the second counter reading previously stored therein, and when a maximum second counter reading defined for the respective virtual connection is exceeded upwardly by the second counter reading just supplied to the adder means, the adder means supplies a second exceed signal which indicates exceeding of the transmission bit rate defined for the respective virtual connection.

5. A circuit arrangement according to claim 4 wherein during the course of a control cycle activated upon the appearance of a message cell, the adder means increments a second counter reading which is first stored in the respective memory area of the write-read memory by the bit rate value stored in the respective memory area after reception of a respectively defined plurality of bits belonging to the message cell which has caused that control cycle.

6. A circuit arrangement according to claim 4, wherein a normalized bit rate value ("1") is allocated to a maximum transmission bit rate maximally usable for the transmission of message cells during the virtual connections, and based on the normalized bit rate value and on the duration of one of said defined time intervals a uniform, maximum second counter reading is defined for all virtual connections, and given a current transmission bit rate defined for the respective virtual connection that deviates from the maximum transmission bit rate, the bit rate value allocated to the respective virtual connection is equal to a multiple of the normalized bit rate value which multiple corresponds to the ratio of the maximum transmission bit rate to the current transmission bit rate.

7. A circuit arrangement according to claim 4, wherein the bit rate value and the maximum second counter reading are separately defined for each of the virtual connections based on the transmission bit rate defined for the respective virtual connection and on the duration of one of said defined time intervals.

8. A circuit arrangement according to claim 1 wherein said adder means comprises a register and an adder, a first counter reading stored in one of the memory areas of the write-read memory is accepted via loading inputs into the register during a control cycle, said first counter reading is supplied via data outputs of the register to first inputs of the adder, a numerical value corresponding to a unit count is supplied to second inputs of the adder, a first counter reading changed by the adder is entered via data inputs into the register, while overwriting the first counter reading previously entered therein, and, at the end of the control cycle, a first counter reading previously entered in the register that may have been repeatedly changed during the course of the control cycle by repeated acceptance into the adder and subsequent entry into the register is entered via said data outputs into the respective memory area of the write-read memory.

9. A circuit arrangement according to claim 4 wherein the adder means comprises an adder and a register arrangement which is connected after the adder and said register arrangement is formed of two separate registers, during the course of a control cycle, a first counter reading stored in the memory area of the write-read memory for the respective control cycle is accepted into a first of the registers via loading inputs from the write-read-memory and the second counter reading stored together with the first counter reading is accepted into a second of the registers, the first counter reading and the second counter reading are successively supplied in a fixed sequence to first inputs of the adder via a first controllable data selector from the respective register, second inputs of the adder are supplied via a second data selector controlled together with the first data selector which are either a numerical value which corresponds to the unit count for the changing of the respective first counter reading of a bit rate value from the write-read memory that is stored together with the respective second counter reading, a changed first counter reading or, respectively, second counter reading is produced by the adder and is entered via data inputs into the respective register, while overwriting the first counter reading or, respectively, the second counter reading previously entered therein; and, at the end of the respective control cycle, a first counter reading or, respectively, second counter reading entered in the respective register acceptance of signals into the adder, and subsequent entry into the respective register is made via the first data selector into the respective memory area of the write-read memory.

* * * * *